United States Patent [19]

Mitsuhashi et al.

[11] Patent Number: 5,055,955
[45] Date of Patent: Oct. 8, 1991

[54] DUAL MAGNETIC RECORDING AND REPRODUCTION HEADS WITH ELASTIC MOUNTING

[75] Inventors: Daisuke Mitsuhashi; Noboru Kawasaki, both of Tokyo, Japan

[73] Assignee: Fuji Photo Film Co., Ltd., Kanagawa, Japan

[21] Appl. No.: 489,396

[22] Filed: Mar. 5, 1990

[30] Foreign Application Priority Data

Mar. 16, 1989 [JP] Japan .................................. 1-62285
Jun. 9, 1989 [JP] Japan .................................. 1-145444

[51] Int. Cl.$^5$ .......................... G11B 5/54; G11B 21/16
[52] U.S. Cl. .................................... 360/104; 360/122
[58] Field of Search ................. 360/104, 122, 130.34

[56] References Cited

U.S. PATENT DOCUMENTS 4,796,129  1/1989  Umebayashi et al. ......... 360/130.34
4,945,436  7/1990  Nagashima ..................... 360/130.34

*Primary Examiner*—Robert S. Tupper
*Attorney, Agent, or Firm*—Sughrue, Mion, Zinn, Macpeak & Seas

[57] ABSTRACT

A magnetic recording and reproduction device having magnetic heads opposing each other across a magnetic disk. The heads have shaped control portions to generate a negative pressure between the magnetic heads and the magnetic disk. Each magnetic head is supported by an elastic member which is structured to be slightly dislocatable by the negative pressure. The magnetic heads are caused by the negative pressure to come in sliding contact with both sides of the magnetic disk, thereby obtaining positive sliding contact with extremely small contact resistance between the magnetic heads and the magnetic disk and achieving a good head contact while minimizing abrasion of the magnetic disk and the magnetic heads. The control portions to generate the negative pressure are formed integrally with the magnetic heads, thus simplifying the structure, reducing the manufacturing steps such as positioning procedures and achieving a reduction in cost.

11 Claims, 5 Drawing Sheets

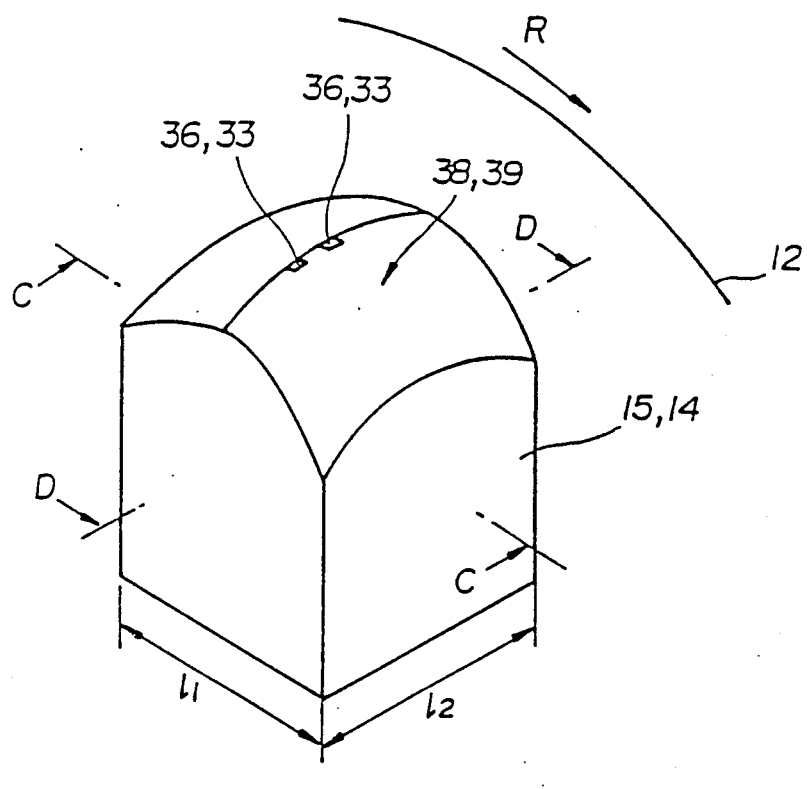
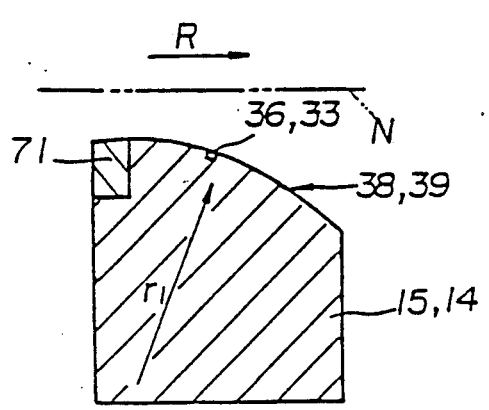
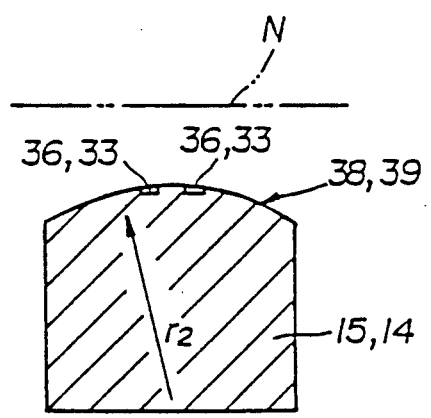

DUAL MAGNETIC RECORDING AND REPRODUCTION HEADS WITH ELASTIC MOUNTING

BACKGROUND OF THE INVENTION

This invention relates to a magnetic recording and reproduction device that enables recording and reproduction on both sides of a magnetic disk.

Heretofore, there have been magnetic recording and reproduction devices for recording and reproduction on both sides of a magnetic disk which incorporate regulating plates to generate a positive pressure between the regulating plates and the magnetic disk, thereby obtaining a good head contact.

Specifically, a pair of magnetic heads are disposed contactably with the magnetic disk, each at a respective side of the magnetic disk and a pair of regulating plates also are disposed, each at a respective side of the magnetic disk. Each individual magnetic head opposes the individual regulating plate across the magnetic disk and is moved to come in contact with the magnetic disk during recording and reproduction. In this case, the regulating plate generates a positive pressure between the rotary magnetic disk and the regulating plate to urge the magnetic disk towards the magnetic head side, thereby obtaining a good head contact.

However, in such prior art recording and reproduction devices, the magnetic heads and the regulating plates must be separately disposed. This inevitably requires a very precise independent positioning for each of these magnetic heads and regulating plates.

Furthermore, since the prior art device configuration requires two independent sets of the magnetic head and the regulating plate, which involves an increasingly difficult positioning adjustment, it is very difficult to obtain a good head contact. Moreover, the device structure becomes complicated and large in size.

Moreover, the device configuration using the prior art regulating plates results in a high degree of friction between the magnetic disk and each of the regulating plates and magnetic heads. The friction poses a problem of considerable abrasion of the magnetic disk, the regulating plates, and the magnetic heads.

OBJECT OF THE INVENTION

With a view to eliminate the above prior art problems of magnetic recording and reproduction devices, it is a primary object of the present invention to provide a magnetic recording and reproduction device for recording and reproduction on both sides of a magnetic disk, which is simple in structure and enables a good head contact, yet experiences suppressed abrasion of the magnetic disk and magnetic heads.

SUMMARY OF THE INVENTION

In accordance with the present invention which attains the above object, there is provided a magnetic recording and reproduction device comprising magnetic heads disposed opposite to each other across a magnetic disk and contactable with individual recording surfaces on both sides of the magnetic disk, supporting means for detachably supporting the individual magnetic heads, elastic members individually disposed between the individual magnetic heads and the supporting means for fine movement of the magnetic heads with respect to the magnetic disk, and a control portion formed on at least one of the magnetic heads to generate a negative pressure between the magnetic disk and the magnetic heads in association with rotation of the magnetic disk, which deforms the elastic members to cause the individual magnetic heads to come in sliding contact with both sides of the magnetic disk.

The individual magnetic heads supported by the supporting means, opposing each other across the magnetic disk, approach the recording surfaces of the individual sides of the magnetic disk. Then, in association with rotation of the magnetic disk, a negative pressure is generated between the control portion formed on the magnetic head and the magnetic disk to attract the magnetic disk to either magnetic head side. In this case, an elastic member disposed between the magnetic head and the supporting means to slightly dislocate the magnetic head deforms and the individual magnetic heads opposing across the magnetic disk come in sliding contact with the individual sides of the magnetic disk.

Thus, a good head contact with the individual sides of the magnetic disk and small contact resistance is achieved by the extremely simple arrangement.

BRIEF DESCRIPTION OF THE DRAWINGS

FIG. 8 is a schematic perspective view showing a magnetic head.

FIG. 9 and FIG. 10 are respectively cross sectional views taken along lines C—C and D—D in FIG. 8.

DESCRIPTION OF THE PREFERRED EMBODIMENTS

A preferred embodiment of the inventive magnetic recording and reproduction device will now be described in detail with reference to the drawings.

Figure 1:
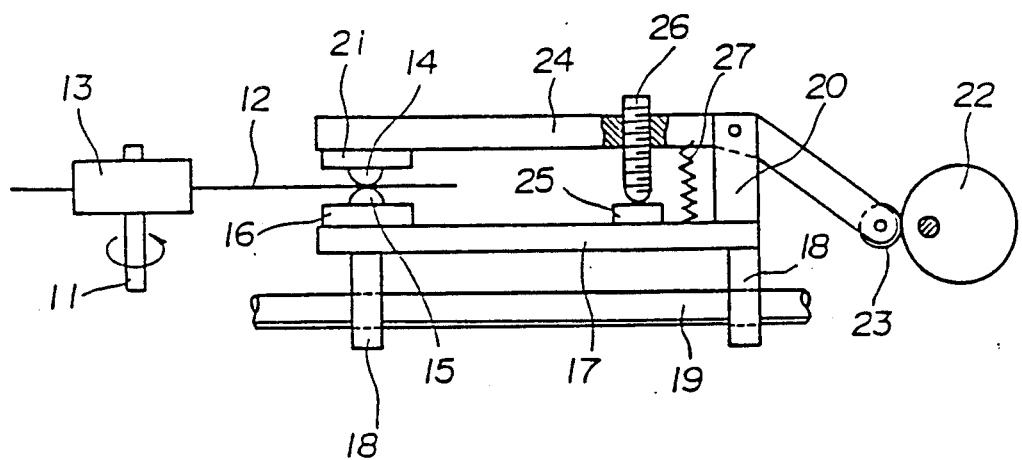
FIG. 1 and FIG. 2 are schematic side views showing an embodiment of the inventive magnetic recording and reproduction device.

As shown in FIG. 1, a center hub 13 which is concentrically and integrally disposed at the center of a magnetic disk 12 is put on a drive shaft 11 of a motor (not shown). Magnetic heads 14 and 15 are individually disposed at the upper side and lower side of the magnetic disk 12, which is rotated at a high speed by the operation of the motor, and front ends of the magnetic heads 14 and 15 are in sliding contact with the magnetic disk 12.

The magnetic head 15 is mounted to a base plate 17 through a supporting member 16. The base plate 17 is slidably supported by a guide bar 19, which penetrates a pair of protrusions 18 in the horizontal direction in the Figure, the protrusions extending from the bottom surface of the base plate 17.

Also extending from the base plate 17, at its right side in its Figure, is a vertically protruding supporting plate 20. At the extended end of the supporting plate 20 is rotatably supported an intermediate point of an arm 24 provided at one end with a roller 23 rolling on the periphery of a cam 22. To the other end of arm 24 is attached the magnetic head 14 through a supporting member 21. Positioned between the supporting plate 20 and the magnetic head 14 is an adjusting screw 26 for positioning the magnetic head 14, which is threaded vertically and contacts at its lower end a positioning plate 25 formed on the base plate 17.

With the above structure, as the base plate 17 moves along the guide bar 19, the pair of magnetic heads 14 and 15 are moved in the radial direction of the magnetic disk 12 to change the track.

Figure 2:
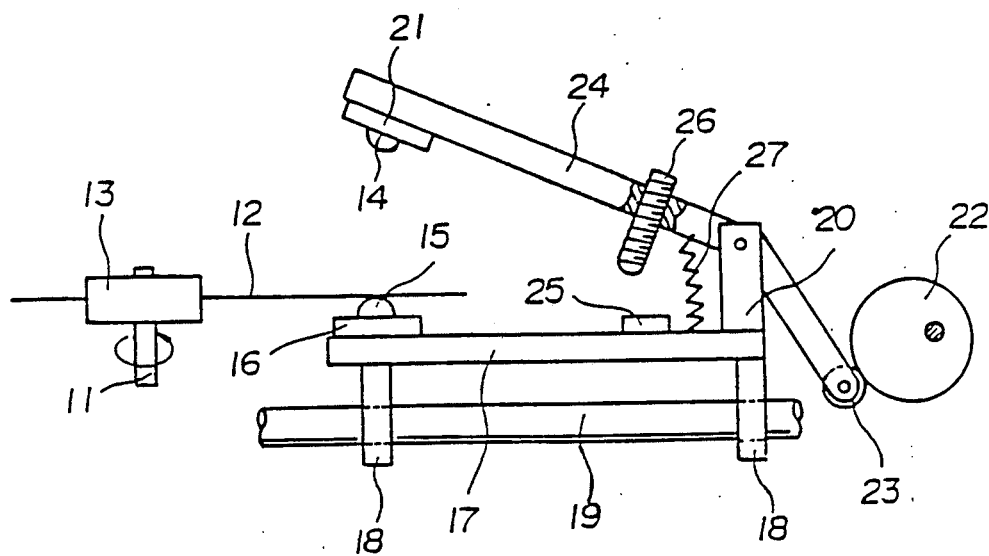

As shown in FIG. 2, as the cam 22 rotates, the roller 23 rolls on its periphery to push down the other end of the arm 24 and raise one end, moving the magnetic head 14 away from the recording surface of the magnetic disk 12. The magnetic disk 12 can be replaced at this time. Furthermore, a tension spring 27 is disposed between the base plate 17 and the arm 24 located between the supporting plate 20 and the magnetic head 14. The tension spring 27 gives an urging force to cause the arm 24, which has been brought away from the magnetic disk 12, to come in sliding contact with the magnetic disk 12.

Figure 3:
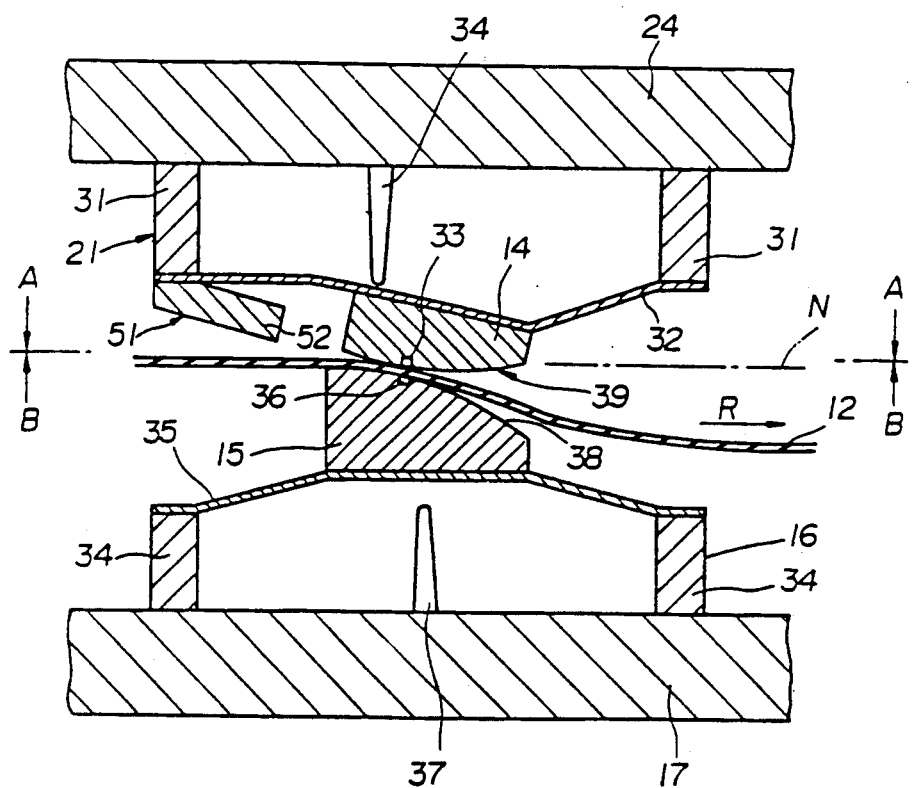
FIG. 3 is a schematic cross sectional view of a magnetic head.

The supporting members 21 and 16 thus provided with the magnetic heads 14 and 15 will be described in detail. Referring to FIG. 3 which is a cross sectional view in the vicinity of the supporting members 21 and 16, a pair of mounting plates 31 are protrudingly disposed at a predetermined interval on the lower surface of the arm 24. Between the pair of mounting plates 31 is provided a vertically deformable thin elastic plate 32 fixed to the individual mounting plates 31. To the disk-facing surface of plate 32 is mounted the magnetic head 14, having a magnetic gap 33 formed on the head surface opposing the magnetic disk 12.

On the lower surface of the arm 24 between the mounting plates 31 is protrudingly provided a positioning pin 34 which contacts the magnetic head 14 to prevent the magnetic head 14 from further withdrawing and to properly position the magnetic head 14.

On the upper surface of the base plate 17 is protrudingly provided at a predetermined interval a pair of mounting plates 34. Between the pair of mounting plates 34 is provided a vertically deformable thin elastic plate 35 fixed to the individual mounting plates 34. To the disk-facing surface of the elastic plate 35 is mounted the magnetic head 15 at a position opposing the magnetic head 14. The head 15 has a magnetic gap 36 formed on its surface opposing the magnetic disk 12. On the upper surface of the base plate 17 between the mounting plates 34 is protrudingly provided a positioning pin 37 which contacts the magnetic head 15 to prevent the magnetic head 15 from unnecessary withdrawing towards the base plate 17 and to properly position the magnetic head 15.

The free rotary surface plane N shown in chain line refers to the position of the recording surface of the magnetic disk 12 which is rotating with no external forces other than a rotary driving force.

On the individual surfaces of the thus supported magnetic heads 15 and 14 opposing the magnetic disk 12 are formed inclined curved surfaces 38 and 39 which are formed so that the surfaces become more distant from the free rotary surface plane N of the magnetic disk 12 in the rotational direction (arrow R) of the magnetic disk 12. As a result, in association with rotation of the magnetic disk 12, a negative pressure is generated between the magnetic disk 12 and the inclined surfaces 38 and 39. The negative pressure cancels a deformation of the disk away from the free rotary surface plane.

The mounting plate 31 located at the upstream side of the magnetic head 14 is provided with a positive pressure generating type auxiliary plate 52, having an inclined surface 51 formed on the surface opposing the magnetic disk 12, which is inclined so as to become gradually closer to the free rotary surface plane N in the rotational direction of the magnetic disk 12. As the magnetic disk 12 rotates, a positive pressure is generated between the auxiliary plate 52 and the magnetic disk 12, which acts to push the magnetic disk 12 towards the magnetic head 15 side.

Figure 4:
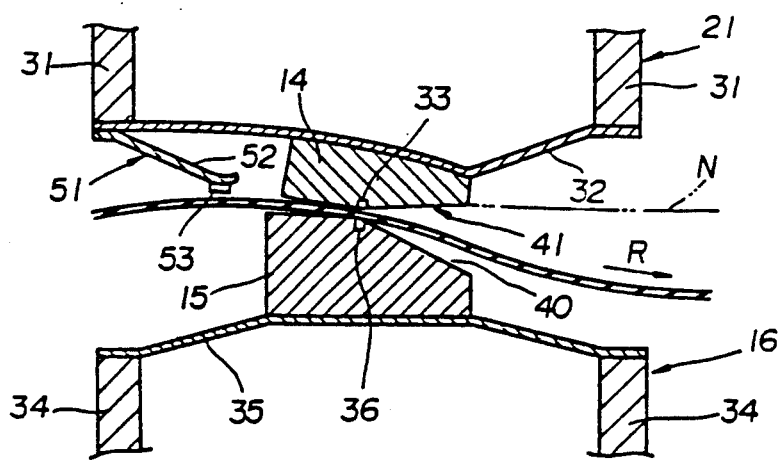
FIG. 4 and FIG. 5 are schematic cross sectional views showing another embodiment of the inventive magnetic recording and reproduction device.

Alternatively, as shown in FIG. 4, inclined planar surfaces 40 and 41, formed to become more distant from the free rotary surface plane N of the magnetic disk 12 in the rotational direction (arrow R) of the magnetic disk 12 and differing in inclination angle between the individual sides of the magnetic gaps 36 and 33, may be formed on the individual surfaces of the magnetic heads 15 and 14 opposing the magnetic disk 12.

In this example, the auxiliary plate 52 shown in FIG. 3 is made of a plate spring, of which the surface opposing the magnetic disk 12 is provided with the inclined surface 51. Thus, as the magnetic disk 12 rotates, a positive pressure is generated between the magnetic disk 12 and the inclined surface 51, and the magnetic disk 12 can be pushed by the positive pressure towards the magnetic head 15 side and is also urged by the urging force of the plate spring to the magnetic head 15 side. Therefore, the front end of the plate spring is provided with a pad 53 comprising felt or the like to prevent the magnetic disk 12 from being damaged when the front end comes in contact with the magnetic disk 12. Naturally, the auxiliary plate 52 as shown in FIG. 3 may be used in place of the plate spring.

Figure 5:
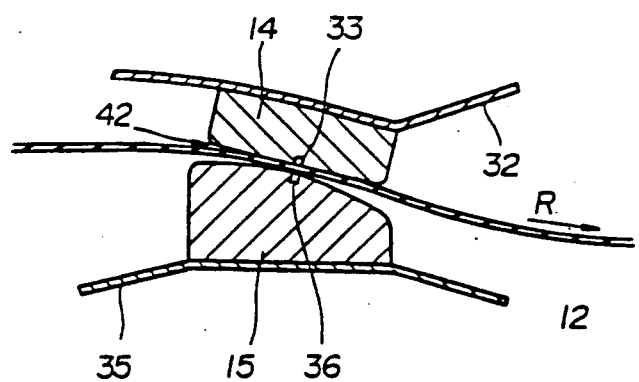

It should be noted that, as shown in FIG. 5, the disk-facing surface of the magnetic head 14 mounted to the elastic plate 32 may be a flat surface, rather than the curved surface of FIG. 3 or the waled surface of FIG. 4.

Referring to FIGS. 3, 4 and 5, as the magnetic disk 12 rotates, a negative pressure is generated between the inclined curved surface 38 or the inclined flat surface 40 of the magnetic head 15 and the magnetic disk 12. As a result, the magnetic head 15 tends to be drawn toward the magnetic disk 12, causing a deforming of the elastic plate 35, and the magnetic disk 12 is deflected toward the magnetic head 15.

At the same time, a negative pressure is also generated between the inclined curved surface 39 or the inclined flat surface 41 or a flat surface 42 of the magnetic head 14 and the magnetic disk 12. As a result, the magnetic head 14 tends to be drawn toward the magnetic disk 12, causing a deforming of the elastic plate 32 towards the magnetic disk 12, and the disk is attracted toward the magnetic head 15 by a stronger negative pressure. At the same time, the auxiliary plate 52 generates a positive pressure between the auxiliary plate 52 and the magnetic disk 12 to push the magnetic disk 12 towards the magnetic head 15 side, thereby promoting even further the above-described actions.

Thus, the individual magnetic gaps 36 and 33 of the magnetic heads 15 and 14, respectively, are in sliding contact with the individual recording surfaces of the magnetic disk 12 which rotates between the magnetic gaps 36 and 33, thus achieving a good head contact to conduct satisfactory recording and reproduction on both sides of the magnetic disk.

Figure 6:
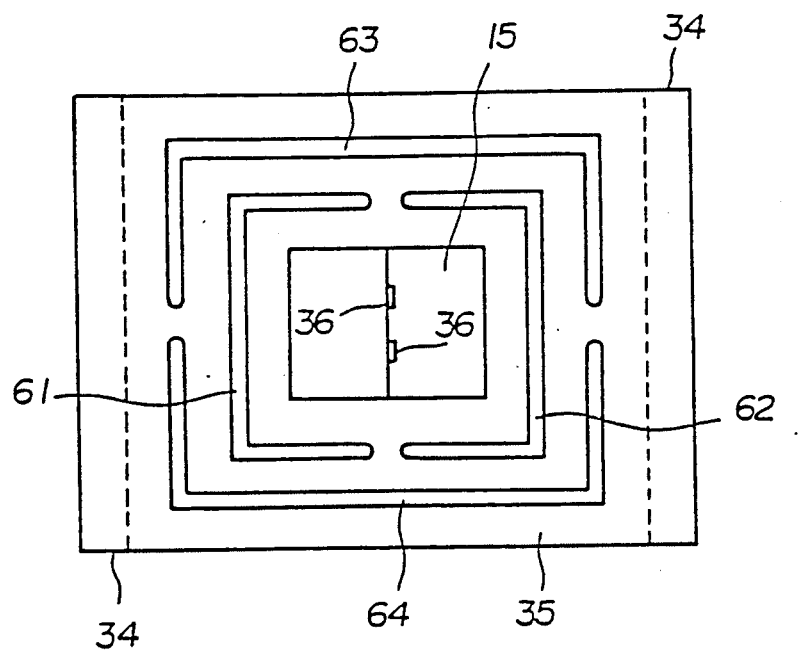
FIG. 6 is a schematic cross sectional view taken along line A—A in FIG. 3.

The elastic plates 32 and 35 which achieve minute dislocation, mainly in a direction normal to the free rotary surface plane, are arranged, for example, as follows. As shown in FIG. 6 which is taken along line A—A in FIG. 3, the elastic plate 35 has a first pair of slots 61 and 62, shaped as a rectangle and symmetrically surrounding the magnetic head 15, which is provided at the center of the elastic plate 35, from the right and left sides and, at the outsides of the first pair of slots 61 and 62, a second pair of slots 63 and 64, also shaped as a rectangle and symmetrically surrounding the magnetic head 15 from the upper and lower sides, thus forming a so-called gimbal spring. Therefore, as shown in FIG. 3, when the magnetic head 15 disposed on the elastic plate 35 is applied with a force exerted at the upper side in the figure by a negative pressure, the magnetic head 15 is moved almost perpendicular to the upper side.

On the other hand, the magnetic head 14 opposing the magnetic head 15 is moved downward while slightly inclining its front end, rather than a pure perpendicular movement, in order to achieve a better head contact.

Figure 7:
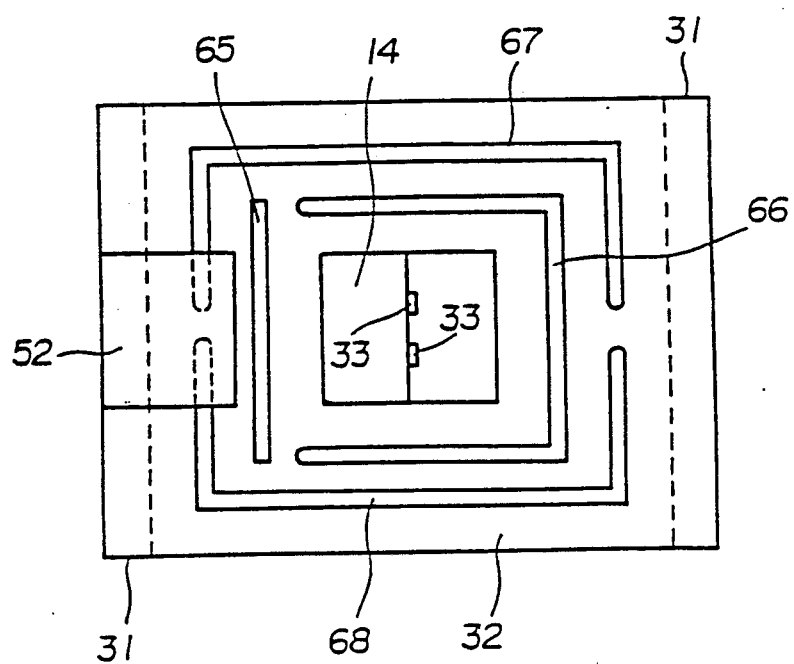
FIG. 7 is a schematic cross sectional view taken along line B—B in FIG. 3.

To this end, the pairs of slots provided in the elastic plate 32 holding the magnetic head 14 are not symmetrical, as those provided in the elastic plate 35. As shown in FIG. 7 which is taken along line B—B in FIG. 3, the elastic plate 32 has a slot 65 in the vertical direction along the left side of the magnetic head 14 which is disposed at the center of the elastic plate 32, and also has a U-shaped slot 66 which surrounds the remaining periphery of the magnetic head 14. Furthermore, at the outer sides of the pair of slots 65 and 66, there are provided a second pair of slots 67 and 68 symmetrically surrounding the magnetic head 14 from the upper and lower sides. Therefore, as shown in FIG. 3, when the magnetic head 14 is applied with a force exerting downward by a negative pressure, the magnetic head 14 is moved downward and protruded while inclining about its left end.

FIG. 8 is a schematic perspective view showing the magnetic heads 14 and 15 used in the embodiment which have been described with reference to FIG. 3, and FIG. 9 is a schematic cross sectional view of the magnetic heads 14 and 15 taken along line C—C in FIG. 8, that is, along the rotational direction (arrow R) of the magnetic disk 12. As shown in these figures, the inclined curved surfaces 39 and 38, as described in the embodiment, are inclined so as to gradually become distant from the free rotary surface plane N in the rotational direction of the magnetic disk 12, for example, with a curvature radius $r_1$. Furthermore, an upstream end 71 of the magnetic heads 14 and 15 is made of a high-hardness material such as sapphire in order to prevent abrasion due to contact with the magnetic disk 12.

FIG. 10 is a schematic cross sectional view showing the magnetic heads 14 and 15 taken along line D—D in FIG. 8, that is, along the radial direction of the magnetic disk 12. As shown in FIG. 10, the inclined curved surfaces 39 and 38 of the magnetic heads 14 and 15 are inclined so that the magnetic gaps 33 and 36 are at the tops in the cross sectional plane along the radial direction of the magnetic disk 12, for example, with a curvature radius $r_2$. Therefore, the inclined curved surfaces 39 and 38 of the magnetic heads 14 and 15 are nearly spherical curved surfaces with the magnetic gaps 33 and 36 at the tops. When $r_1$ and $r_2$ are set to be nearly equal to each other, the curvature radii may be, for example, approximately 50 to 150 mm. Of course, $r_1$ and $r_2$ may alternatively be different, for example, so that the cross sectional front edges taken along the radial direction of the magnetic disk 12 are straight, that is, $r_2 = \infty$.

Alternatively, the above-described inclined curved surfaces 39 and 38 or the inclined flat surfaces 41 and 40 or the flat surface 42 may be provided with grooves along the rotational direction of the magnetic disk 12 to regulate the air flow and promote the generation of negative pressure. To be short, control portions which generate negative pressure between the magnetic disk 12 and the control portions in association with high-speed rotation of the magnetic disk 12 to attract the magnetic disk 12, may be formed on the surfaces of the magnetic heads 14 and 15 opposing the magnetic disk 12.

The magnetic heads 14 and 15 thus provided with the negative pressure generating control portions may have such dimensions as shown in FIG. 8 in which, for the magnetic head 15 which is required to generate a higher negative pressure, $l_1$ is at least about 1.2 mm and $l_2$ is at least about 1.2 mm, where $l_1$ is the length of a side along the rotational direction of the magnetic disk 12 and $l_2$ is the length of a side nearly perpendicular to the rotational direction. With such dimensions, the magnetic head 15 can generate a sufficient negative pressure. For the magnetic head 14 which is to generate a relatively lower negative pressure, for example, $l_1$ may be at least about 170 μm and $l_2$ may be at least about 280 μm.

In this embodiment the elastic plate 32 comprises a so-called gimbal spring plate. However, the elastic plate 32 may alternatively be formed from a thin-plate-formed rubbery elastic material, and any other materials that are slightly deformable by a negative pressure may be used. Furthermore, the shapes and arrangements of the arm 24 and the cam 22 to detachably support the magnetic head 14 relative to the magnetic disk 12 are not restricted to this embodiment. For example, the surface of the cam 22 sliding with the roller 23 may be formed so that the vertical approaching speed to the magnetic disk 12 of the arm 24 in association with the rotation of the cam 22 is sufficiently small immediately before contacting the magnetic disk 12.

What is claimed is:

1. A device for recording and reproducing information on both sides of a rotatable magnetic disk which defines a free rotary surface plane, comprising:
    a pair of magnetic heads disposed facing each other on opposite sides of said magnetic disk, and adapted to individually contact recording surfaces on respective opposite sides of said magnetic disk,
    head supporting means for individually supporting said magnetic heads,
    at least one elastic member disposed between one of said magnetic heads and said supporting means and operative to provide fine controlled movement of said magnetic head in a direction substantially perpendicular to said magnetic disk, and
    a control portion formed on said one magnetic head and operative to generate a negative pressure between said magnetic disk and said one magnetic head in response to rotation of said magnetic disk, said negative pressure acting to deform said at least one elastic member to attendantly cause said one magnetic head to come in sliding contact with an adjacent side of said magnetic disk.

2. The device of claim 1 wherein said elastic member comprises an elastic plate, having peripheral edge portions and a central portion for supporting said one magnetic head, and plate supporting means providing support between said head supporting means and said peripheral edge portions of said plate.

3. The device of claim 2 wherein said elastic plate is shaped within its peripheral edge portions to provide a directional spring action.

4. The device of claim 3 wherein said elastic plate has slots disposed to provide said directional spring action.

5. The device of claim 3 wherein said elastic plate is shaped to define a gimbal spring.

6. The device of claim 1 wherein each of said heads is supported by an elastic member.

7. The device of claim 6 wherein the elastic member supporting a first head in the pair is a plate having symmetrical slots about a center thereof, and the elastic member supporting a second head in the pair is a plate having asymmetrical slots about a center thereof.

8. An elastic magnetic head support for a recording and reproducing device including a pair of magnetic heads disposed facing each other on opposite sides of a magnetic disk, and adapted to individually contact recording surfaces on respective opposite sides of said magnetic disk, and supporting means for individually supporting said magnetic heads, comprising:

an elastic member having peripheral edge portions affixed to said supporting means and a central portion supporting one of said magnetic heads, said elastic member being disposed between said one magnetic head and said supporting means for providing fine control movement of said one magnetic head in a direction substantially perpendicular to said magnetic disk, wherein said one magnetic head comprises a control portion formed integrally therewith for generating a negative pressure between said magnetic disk and said one magnetic head in response to rotation of said magnetic disk, said negative pressure acting to deform said elastic member to attendantly cause said one magnetic head to come in sliding contact with an adjacent side of said magnetic disk.

9. The elastic magnetic head support of claim 8 wherein said elastic member comprises an elastic plate shaped within said peripheral edge portions to provide a directional spring action.

10. The elastic magnetic head support of claim 9 wherein said elastic plate has slots disposed to provide a directional spring action.

11. The elastic magnetic head support of claim 10 wherein said elastic plate defines a gimbal spring.

* * * * *